J. D. RAFERT.
MACHINE FOR MAKING PRESLICED BREAD LOAVES.
APPLICATION FILED NOV. 2, 1917.

1,309,419.

Patented July 8, 1919.
3 SHEETS—SHEET 1.

WITNESSES.
H. L. Opsahl.
E. E. Wells

INVENTOR
J. D. RAFERT
BY HIS ATTORNEYS
Williamson Merchant

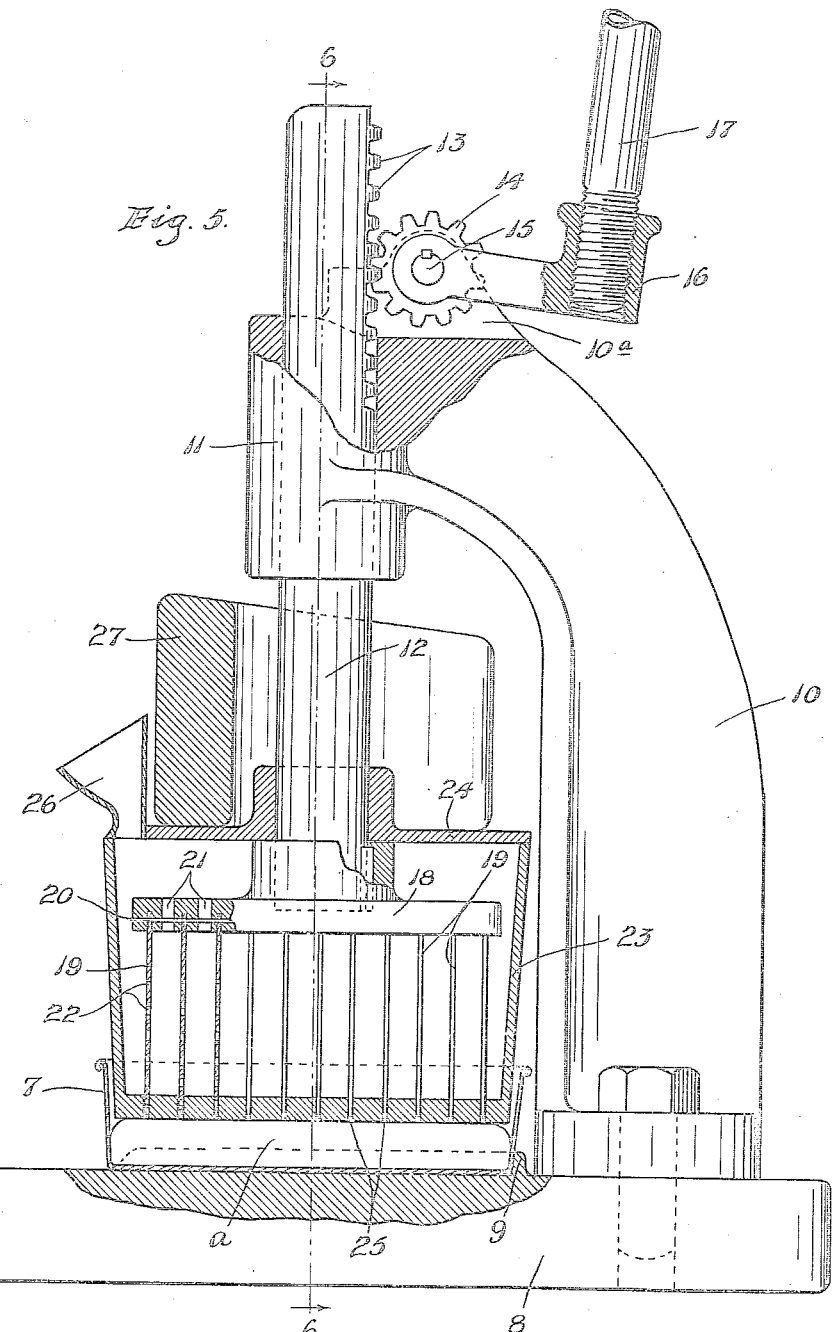

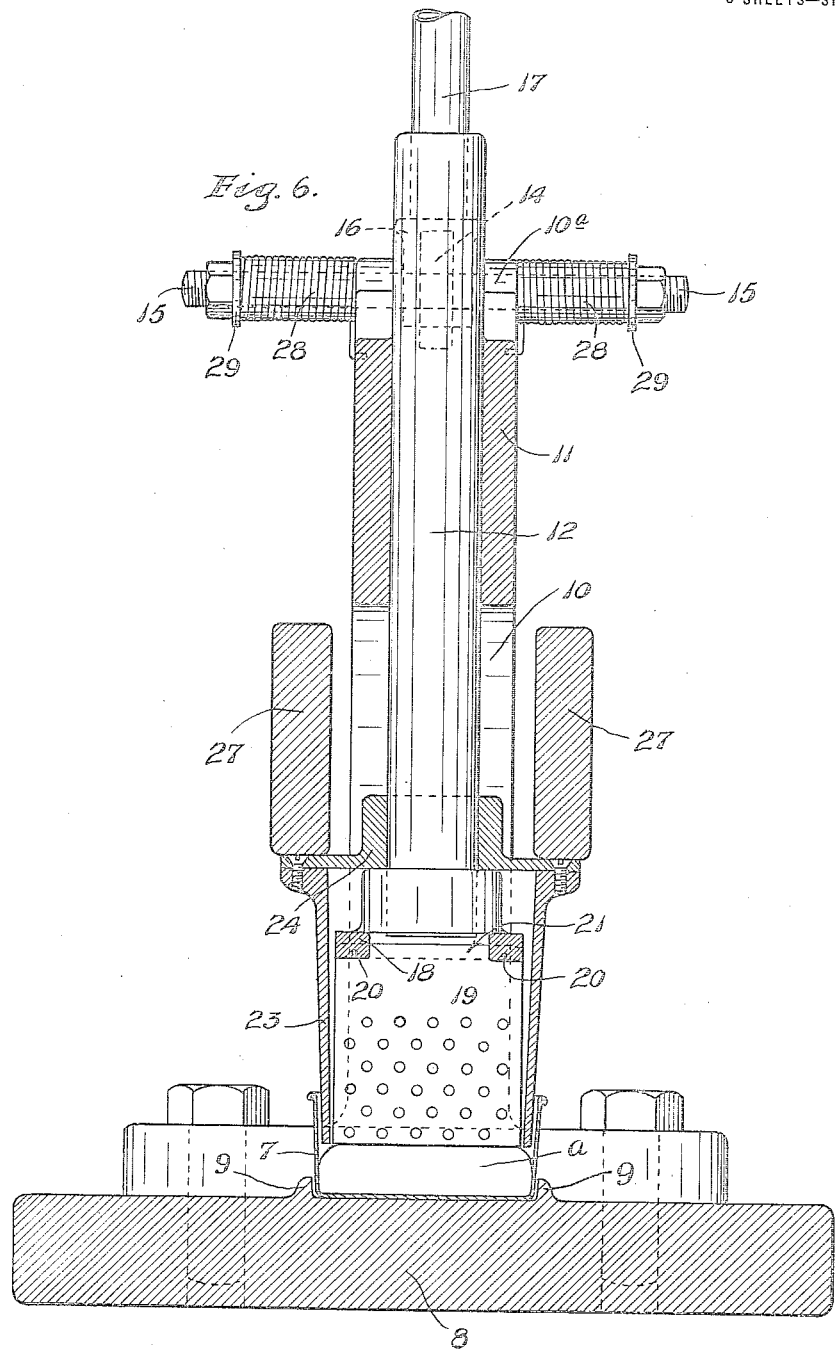

UNITED STATES PATENT OFFICE.

JOHN D. RAFERT, OF MINNEAPOLIS, MINNESOTA.

MACHINE FOR MAKING PRESLICED BREAD-LOAVES.

1,309,419.   Specification of Letters Patent.   Patented July 8, 1919.

Application filed November 2, 1917. Serial No. 199,947.

*To all whom it may concern:*

Be it known that I, JOHN D. RAFERT, a citizen of the United States, residing at Minneapolis, in the county of Hennepin and State of Minnesota, have invented certain new and useful Improvements in Machines for Making Presliced Bread-Loaves; and I do hereby declare the following to be a full, clear, and exact description of the invention, such as will enable others skilled in the art to which it appertains to make and use the same.

My invention has for its object to provide a novel apparatus for preslicing loaves of bread adapted for use in carrying out my improved process, as disclosed and broadly claimed in my co-pending application filed November 12, 1918, under S. N. 262,147, and entitled "Pre-sliced bread loaf."

To the above end, the invention consists of the novel devices and combination of devices hereinafter described and defined in the claims.

In the accompanying drawings, which illustrate the invention, like characters indicate like parts throughout the several views.

Referring to the drawings:—

Fig. 5 is a view partly in side elevation and partly in vertical section, showing the machine or apparatus; and Fig. 6 is a transverse section taken approximately on the line 6—6 of Fig. 5.

Figure 1:
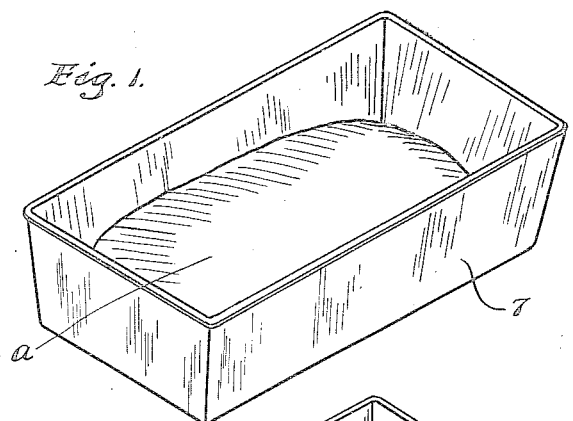
Figure 1 is a perspective view showing a baking pan containing sufficient dough for one loaf of bread.
Figure 2:
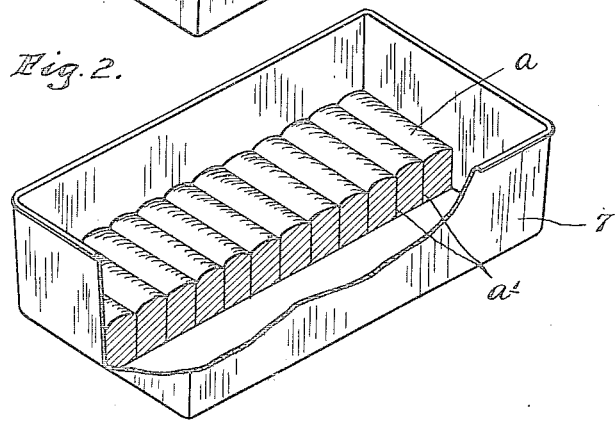
Fig. 2 is a perspective view, some parts being broken away and same parts sectioned, showing the pan with the pre-sliced dough before the latter is finally raised and before it is baked.
Figure 3:
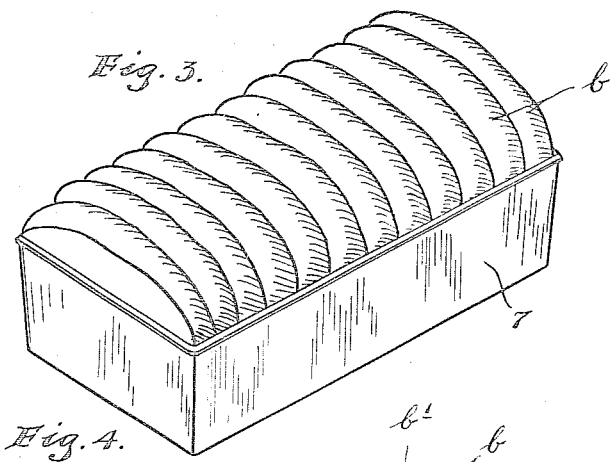
Fig. 3 is a perspective view showing the baked loaf contained in the pan.
Figure 4:
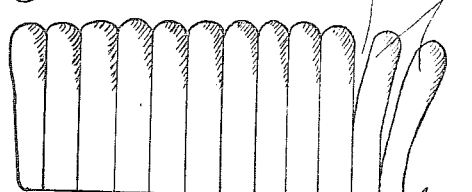
Fig. 4 is a side elevation of the baked loaf with several slices partially severed from the loaf.

The numeral 7 indicates an ordinary baking pan of a size to contain the dough for one loaf of bread. In Fig. 1, the character $a$ indicates the dough from which the loaf is to be formed. In Fig. 2, the dough $a$, which has not yet been finally raised and which has not, of course, yet been baked, is cut into slices on the line $a^1$. In Figs. 3 and 4, the baked loaf is indicated, as an entirety, by the character $b$. In Fig. 4, the baked loaf is made up of the baked slices $b$ having contact at $b^1$, and, as already stated, the contacting faces of the slices being quite firmly united.

The machine or apparatus comprises a base 8 having a flange 9 that follows three sides of a rectangle and is adapted to properly position the pan 7 for the action thereon of the knives and coöperating presser head. From the rear of the base 8 rises a strong pedestal 10 terminating in an upright sleeve 11 that is alined with the central portion of the positioned pan 7. Working vertically through the sleeve 11 is a plunger 12 provided with rack teeth 13 that are engageable with an under pinion 14 keyed, or otherwise, rigidly secured on a short shaft 15 journaled in laterally spaced lugs $10^a$ of the pedestal 10. Rigidly secured to the shaft 15 is a lever head 16 from which extends an operating lever or bar 17.

Rigidly secured on the lower end of the plunger 12 is a knife carrying head 18 that has a plurality of independent parallel knife blades 19. These knife blades 19 are spaced apart the proper distance to cut the loaf into slices of the desired thickness; and, as shown, they fit grooves cut in the undersurface of the head 18 and are detachably but rigidly secured thereto by small rods 20 passed through alined perforations in said head and in the upper edge of said blades. Between the blades, the head 18 is provided with grease passages 21. In their body portions, the blades 19 are provided, each with a multiplicity of perforations 22 that are, as will hereinafter appear, adapted to carry the lard, grease, or other fatty matter into the loaf.

The head 18 and blades 19 work within a so-called grease receptacle 23 that has a rigidly, but detachably secured head 24. The said head 24 has a hub through which the plunger is loosely passed so that normally, the grease receptacle 23 is supported on the hub of the head 18. The knife blades 19 work with close engagement through slots 25 in the bottom of the grease receptacle 23. This grease receptacle 23 is adapted to contain lard or other suitable fatty matter for greasing the surfaces of the slices into which the dough is cut. For the purpose of introducing the lard or fatty matter into the receptacle 23, the cover 24 is shown as provided with a funnel neck 26. Loosely placed on the cover 24 is a quite heavy weight 27 shown as of approximately U-shape form and having sufficient weight to produce the desired pressure on the dough while it is being cut by the knives.

As shown in Fig. 6, the shaft 15 projects at both ends and mounted thereon, are coiled torsion springs 28 which, at their inner ends, are anchored to the lugs 10ª, and at their outer ends are anchored to washers 29 which, in turn, are keyed on the ends of the shaft 15, so that they oscillate with the said shaft. These springs exert sufficient force to normally hold the plunger 12, head 18, knives 19, grease receptacle 23 and weight 27 in extreme uppermost positions, to wit, in positions in which the bottom of the receptacle 23 will be above the upper edge of the pan 7. Here attention is called to the fact that in Fig. 5 the grease receptacle 23 is lowered into the pan and in position to engage the dough a.

When the pan with the dough therein is positioned, as shown in Fig. 5, by movement of the lever 17 toward the left in respect to Fig. 5, the plunger 12 is positively forced downward and as it moves downward, its knives, of course are lowered and the grease receptacle under the action of the weight 23, and its own gravity will be lowered therewith until the bottom of the said receptacle rests upon the dough. Then by further movement of the said lever the knives are forced downward through the bottom of the grease receptacle and through the dough and until they strike the bottom of the pan. Under such action, the knives are caused to cut the dough into slices forming sections and the perforations 22 which are filled with grease or fatty matter carry the said grease or fatty matter between the cut surfaces and distribute the same over the entire cut surfaces. Here it will be noted that the perforations 22 are staggered to give a better distribution of the fatty matter. While the cuttting of the dough is taking place, as stated, the bottom of the grease receptacle 23 is pressed against the top of the dough with considerable force and the weight of the receptacle, its contents, and particularly by the weight 27. In practice, the weight 27 has been approximately a fifty pound weight, as this is found to give the desired pressure on the dough. The lower portion of the grease receptacle 23 should quite closely fit the pan 7 so that the dough will not be pressed out of the pan.

When the lever 17 is moved back to its normal position, the first effect is to raise the head 18 and withdraw the knives into the receptacle, with their lower edges, however, closing the slots 25, and then further movement of said lever toward its normal position to pick up and raise the grease receptacle to its normal position above the pan. It will thus be seen that the bottom of the so called grease receptacle serves both as a presser plate for putting the dough under pressure while it is being cut, and acting as a stripper plate for the knives when the latter are being raised out of the dough.

After the dough has been cut and its cut surfaces greased, as above described, it is lifted into the pan and put into the oven and baked.

The slices or sections of the baked loaf will, as already stated, quite closely adhere, that is, they will stick together closely and with sufficient firmness to prevent the slices from being accidentally separated under ordinary and even quite rough handling of the loaf. Nevertheless, the cohesion is so light or fragile that the slices, one at a time, may be pulled off from the loaf without breaking the slices. The flaky softened surface given to the slices makes the same very soft and palatable. It is found in practice that a loaf thus baked will maintain its moisture for a greater length of time than an ordinary integral loaf, and moreover, the slices, even when separated will not dry out as quickly as bread sliced from an ordinary loaf. However, a loaf of this kind is especially adapted to be placed on the table and the slices removed, as desired. This is particularly advantageous for army purposes where each soldier is given a predetermined amount or allowance of bread and where it is, therefore, desirable that the loaves be evenly sliced, so that each soldier gets his proper allowance, and a given number of loaves will always afford the predetermined number of slices. Nevertheless, for general use, the loaf thus baked is desirable.

What I claim is:

1. An apparatus for slicing the unbaked dough or bread loaf, comprising a grease receptacle, knives working through the bottom of said grease receptacle, and means for raising and lowering said knives and grease receptacle and projecting the knives through the bottom of said receptacle when the latter rests upon the dough.

2. An apparatus for slicing the unbaked dough of a bread loaf, comprising a pan for containing the dough, a vertically movable plunger having a head, a multiplicity of knives carried by said head and depending therefrom, a grease receptacle movable vertically on said plunger and carried on said head, said knives working through slots in the bottom of said grease receptacle.

3. An apparatus for slicing the unbaked dough of a bread loaf, comprising a pan for containing the dough, a vertically movable plunger having a head, a multiplicity of knives carried by said head and depending therefrom, a grease receptacle movable vertically on said plunger and carried on said head, said knives working through slots in the bottom of said grease receptacle, the said knives having grease carrying cavities therein.

In testimony whereof I affix my signature in presence of two witnesses.

JOHN D. RAFERT.

Witnesses:
B. G. BAUMANN,
HARRY D. KILGORE.